Patented Jan. 7, 1930

1,742,587

UNITED STATES PATENT OFFICE

CAMILLE DREYFUS, OF LONDON, ENGLAND, ASSIGNOR TO CELANESE CORPORATION OF AMERICA, A CORPORATION OF DELAWARE

LIQUID COATING COMPOSITION

No Drawing. Application filed April 5, 1924, Serial No. 704,526, and in Great Britain May 18, 1923.

My invention relates to the manufacture of solutions, dopes, varnishes, lacquers, films, artificial threads and filaments, celluloid-like masses, plastic or other compositions, moulding powders, sheets, blocks, moulded and pressed articles of all kinds, or other preparations, compositions or articles made with cellulose acetate or other fatty or organic acid esters of cellulose or ethers of cellulose all of which are hereinafter referred to as organic substitution derivatives of cellulose.

More particularly the invention concerns solutions or other preparations, compositions, moulding powders, masses or articles made with cellulose acetate.

I have found that resins such as acaroid resins (known variously as acaroid resin, gum accroides, red gum and Xanthorrhœa resins) and rosin, have remarkable properties in relation to cellulose acetate in particular and to other organic derivatives of cellulose. I have found that the said resins, especially accroides resins are perfectly miscible with cellulose acetates or the other organic derivatives of cellulose in solution, so that for instance on evaporation of a solution of cellulose acetate and acaroid resin in a solvent such as acetone, a strong and tenacious film or coating is obtained in which the acaroid resin is distributed perfectly homogeneously in intimate union or association with the cellulose acetate. The perfect miscibility of said resins, in particular acaroid resins, with cellulose acetate or other organic derivatives of cellulose permits of making very valuable solutions, dopes, varnishes, lacquers, films, masses, preparations, compositions or articles such as referred to.

Moreover I have found that the resin, especially acaroid resin, can be incorporated with cellulose acetate or other organic derivatives of cellulose in any desired proportion relatively thereto. The incorporation of the resin with the cellulose acetate or organic derivative of cellulose may be effected by solution in a volatile or other solvent or solvents or by fusion of the resin and organic derivatives of cellulose in presence or absence of a solvent or solvents. In particular solvents or solvent mixtures having boiling points below about 150° C. though I do not confine myself to this limit. A further important property which I have found to be possessed by resins such as acaroid resin or rosin is that they are capable of imparting to the coatings, films, compositions, preparations or articles made therewith a remarkable degree of impermeability to water and gases, and also remarkable electric insulating properties. Some or all of these advantages are of great importance in many applications, such as dopes for aeroplanes or airship gas bags, varnishes, lacquers, coatings, insulating compositions and preparations, moulded or pressed electrical and other parts and accessories, switchboards, distributor heads for magneto ignition systems, photographic and kinematographic films, glass substitutes, artificial leather, and many other articles and products.

Also I have found that the presence of resins such as acaroid resin or rosin in aeroplane dopes and the like together with cellulose acetate or other organic derivatives of cellulose gives a greatly increased tautening effect on the fabrics to which the dope is applied, the tautening effect being much greater than that exerted by a similar dope containing cellulose acetate alone. It is thus possible in this connection to obtain desired degrees of impermeability and tautness by the application of smaller quantities or fewer coats of dope.

As regards the increased water resisting properties above referred to, it is known that cellulose acetate, for example, in spite of its water resisting character, does still absorb a certain amount of water which is a drawback in many of its technical applications, and I have found that this can be obviated or greatly reduced by incorporating resins such as acaroid resin and/or rosin with the cellulose acetate in making the solutions, compositions, masses, preparations or articles.

In making the solutions, compositions, preparations or articles, the resin and the cellulose acetate or cellulose derivative may be dissolved in low or high boiling solvents such for example as acetone, alcohol-benzol, alcohol-acetone, methyl acetate, ethyl acetate, ethyl methyl ketone, or mixtures of such solvents, or other suitable solvents such as tetrachlorethane with or without alcohol, acetone, etc., either using a mutual solvent or solvents of the cellulose derivative and the resin or a mixture of separate solvents and the resin and the cellulose derivative respectively.

Or the cellulose acetate or cellulose derivative and the resin, in presence or absence of a solvent or solvents may be melted together, or be mixed, kneaded or worked up together under heat, or be mixed and moulded under heat and pressure or otherwise homogeneously incorporated together with the aid of heat, or heat and pressure.

Solvents or solvent mixtures may in particular be employed having boiling points below about 150° C., though I do not confine myself to this limit.

Owing to the great miscibility or physical affinity of said resins, especially acaroid resins, for the cellulose acetate or organic derivative of cellulose, it is possible to dispense with the employment of the usual plasticizers in making the solutions, dopes, varnishes, preparations, films, compositions, articles or products as the resin can be intimately incorporated with and assimilated by the cellulose acetate or cellulose derivative even with a relatively small proportion of a solvent or solvent mixture such as acetone, alcohol-acetone, alcohol-benzol, or other solvents or mixtures referred to, but any known or suitable plasticizing agents may be incorporated if required, according to the product or article to be made, as for instance triacetin, camphor, camphor substitutes, para toluene sulphonamide or derivatives thereof, diethyl phthalate, para toluene sulphanilide, high boiling liquid alkylated benzine-, toluene- or xylene-sulphonamide derivatives or preparations, triphenylphosphate or tricresylphosphate or other plasticizing or softening agents (hereinafter included in the term plasticizers). Other usual or suitable additions may likewise be made according to the product or article concerned, for instance filling materials, such for example as lampblack, red oxide of iron, barytes, and ground cotton waste, dyestuffs or pigments; stabilizers or neutralizers such as urea, or alkyl- or aryl-urea derivatives, pyridine, aniline, toluidine, acetanilide or other bases; or any other usual or suitable additions.

The resin may be used in any desired proportions relatively to the cellulose acetate or cellulose derivative, according to the class of product or article required, and where plasticizers are used the resin may be employed in any desired quantity greater or less than that of the plasticizers or equal thereto.

In making solutions, varnishes, dopes, lacquers, coatings, preparations, films, thermoplastic masses, compositions or moulding powders, and so forth for example, the resin may be used for instance in any proportion up to about 200% on the weight of the cellulose derivative, though I do not confine myself to this limit, as more resin may be used. A dope or varnish containing for example equal weights of cellulose acetate and acaroid resin dissolved in a solvent such as acetone, with or without the addition of some higher boiling solvent or solvents, such as tetrachlorethane, gives a perfectly coherent, impermeable film or coating without any suggestion of separation between the resin and the cellulose acetate.

In making celluloid-like materials or other moulding compositions or moulded products or articles the resin may be incorporated in any desired proportion with the cellulose acetate or organic derivative of cellulose in any suitable way, with or without solvents, plasticizers, filling materials and/or other additions such as referred to. For example, the resin or resins and cellulose derivative or derivatives may be well mixed or kneaded in a ground state with the aid of a small proportion of ordinary or known solvents and with or without addition of plasticizers, filling materials, dyes, pigments and/or other usual additions, and be worked up on heated rollers in the way usual in the manufacture of celluloid or with or without such working up on heated rollers, pressed in hot moulds, or on to surfaces under heat, or extruded under heat through dies and so forth. Or the resin or resins and the cellulose derivative or derivatives may be melted together, with or without a small proportion of solvent and with or without plasticizers, filling materials, dyes or pigments, and/or other additions, and the melted mass be ground up and pressed as so called moulding powders in hot moulds or dies or on to surfaces under heat or extruded under heat through dies, and so forth, with or without the addition of fillers such as red oxide of iron and other fillers, dyestuffs, dyes, etc.

Or the solutions, compositions or powders with or without fillers, dyes, pigments, or other additions may be applied to paper cardboard, textile fabric or to other supports or carriers by brushing, dipping, running, or hot pressure, according to the consistency of the solutions or compositions and the character of the product or article concerned. If desired supports or carriers so treated may be united in moulds or otherwise under heat and pressure to form pressed or moulded articles of any desired kind.

In making artificial leather or leather substitutes the solutions, or compositions of cellulose derivative or derivatives and resin or resins with or without plasticizers and/or other suitable additions may be spread as solutions or pastes upon fabrics or other suitable supports and united thereto by evaporation or under heat and pressure.

The following are some examples of preparations in accordance with the invention, it being understood that these are given only in illustration and are in no way limitative.

(1) *Dope, varnish or the like*

Cellulose acetate_____ 100 parts
Acaroid resin_____ 100 to 200 parts
Acetone_____ 250 to 1500 parts with or without addition of one or more other substances, such as higher or high boiling solvents; plasticizers, stabilizers such as urea or urea derivatives; combustibility reducers such as triphenylphosphate; filling materials, dyes, pigments or other effect materials.

(2) *For a thermoplastic or moulding composition*

Cellulose acetate_____ 100 parts
Acaroid resin_____ 50–100 parts
Acetone_____ 100 parts Mix well with or without heat and with or without other additions such as referred to in Example 1.

(3) *For a moulding powder*

Cellulose acetate_____ 100 parts
Acaroid resin_____ 80 parts
Paratoluene sulphonamide, paratoluene sulphonanilide, or a liquid high boiling alkylated xylene-, toluene- or benzene-sulphonamide derivative or preparation such as specified in British specifications 132,283, 133,353 or 154,334_____ 70 parts Melt together, with or without a small quantity of volatile solvent and with or without one or more substances such as stabilizers (e. g. urea or urea derivatives), triphenylphosphate, filling materials, dyes, pigments or other effect materials. The mass is afterwards ground to a powder. Some of the additions when employed, such as filling materials, pigments, effect materials and so forth may be added during the grinding.

(4) *For a moulding powder*

Cellulose acetate_____ 100 parts
Ordinary rosin_____ 80 parts
Paratoluene sulphonamide or a liquid high boiling alkylated xylene-, toluene- or benzyl sulphonamide derivative such as specified in Example 3_____ 70 parts Melt together, with or without a small quantity of volatile solvent and with or without one or more substances such as referred to in Example 3, and work up as in Example 3.

It is further to be understood that mixtures of the aforesaid resins together or mixtures of one or more of them with another resin or resins may be employed according to the invention. By the term "resin" as used in the claims I mean the rosins and/or the acaroid resins.

What I claim and desire to secure by Letters Patent is:—

1. A liquid coating composition comprising an organic substitution derivative of cellulose, an acaroid resin and a solvent in proportions to make a liquid coating composition.

2. A liquid coating composition comprising an organic substitution derivative of cellulose, an acaroid resin, plasticizers, and a solvent in proportions to make a liquid coating composition.

3. A liquid coating composition comprising cellulose acetate, an acaroid resin, plasticizers, and acetone in proportions to make a liquid coating composition.

In testimony whereof I have hereunto subscribed my name.

CAMILLE DREYFUS.